(12) United States Patent  (10) Patent No.: US 9,078,092 B2
Piett et al. (45) Date of Patent: Jul. 7, 2015

(54) ROUTING ENGINE FOR EMERGENCY COMMUNICATIONS

(71) Applicants: William T. Piett, Southborough, MA (US); Matthew A. Serra, Morristown, NJ (US); Brett Wilfred Marceau, Clinton, MA (US)

(72) Inventors: William T. Piett, Southborough, MA (US); Matthew A. Serra, Morristown, NJ (US); Brett Wilfred Marceau, Clinton, MA (US)

(73) Assignee: Rave Wireless, Inc., Framingham, MA (US)

( * ) Notice: Subject to any disclaimer, the term of this patent is extended or adjusted under 35 U.S.C. 154(b) by 82 days.

(21) Appl. No.: 13/625,251

(22) Filed: Sep. 24, 2012

(65) Prior Publication Data

US 2013/0077536 A1    Mar. 28, 2013

Related U.S. Application Data

(60) Provisional application No. 61/538,505, filed on Sep. 23, 2011.

(51) Int. Cl.
*H04L 12/16* (2006.01)
*H04W 4/02* (2009.01)
*H04W 4/22* (2009.01)

(52) U.S. Cl.
CPC . *H04W 4/02* (2013.01); *H04W 4/22* (2013.01)

(58) Field of Classification Search
CPC .................... H04W 4/02; H04W 4/22
See application file for complete search history.

(56) References Cited

U.S. PATENT DOCUMENTS

| | | | |
|---|---|---|---|
| 8,401,154 B2 * | 3/2013 | Boni et al. | 379/45 |
| 8,442,481 B2 * | 5/2013 | Maier et al. | 455/404.2 |
| 2011/0064205 A1 | 3/2011 | Boni et al. | |
| 2011/0249658 A1 * | 10/2011 | Wohlert et al. | 370/338 |
| 2011/0258266 A1 | 10/2011 | Serra et al. | |
| 2012/0110128 A1 * | 5/2012 | Aaron et al. | 709/219 |
| 2013/0077536 A1 * | 3/2013 | Piett et al. | 370/259 |

OTHER PUBLICATIONS

National Emergency Number Association (NENA) "Detailed Functional and Interface Specification for the NENA i3 Solution—Stage 3" NENA 08-003 v1, Jun. 14, 2011, (pp. 1-282).
Va Wijk, A. and G. Gybels, "Frame for Real-Time Text over IP Using the Session Initiation Protocol (SIP)," Network Working Group, Jun. 2008 (pp. 1-31).

* cited by examiner

*Primary Examiner* — Robert Wilson
(74) *Attorney, Agent, or Firm* — Occhiuti & Rohlicek LLP

(57) ABSTRACT

A computer-implemented method for processing emergency calls includes receiving an emergency call from a calling device via a first communication format, identifying a location associated with the calling device, identifying a destination for the emergency call based at least in part on the location, determining an attribute associated with the destination, and determining an action to be taken based at least in part on the first communication format and on the attribute.

28 Claims, 2 Drawing Sheets

ROUTING ENGINE FOR EMERGENCY COMMUNICATIONS

RELATED APPLICATIONS

This application claims the benefit of the Sep. 23, 2011 priority date of U.S. Provisional Application 61/538,505, the contents of which are herein incorporated by reference.

FIELD OF DISCLOSURE

This disclosure relates to emergency communications, and in particular, to communications that use a public emergency information network.

BACKGROUND

Public emergency information networks have been used for decades to field emergency calls and to direct those calls to an appropriate emergency service provider. In early systems, the calls were invariably conventional voice calls using the public switched telephone network ("PSTN").

With the advent of multiple telecommunication formats, it has become possible, in principle, to call for help using formats other than voice calls over the PSTN. Such formats include, for example, text messages, e-mails, and calls made using voice over internet protocol ("VOIP").

In recognition of the many new ways to call for help, NG9-1-1 ("Next Generation 9-1-1") has been developed. Among its capabilities is that of receiving and sending communications in a variety of formats. This system is of considerable value to the hearing impaired, who have long had difficulties using the conventional 9-1-1 system in part because of its reliance on voice calls.

The 9-1-1 system is not a single national system, but an internetwork of local 9-1-1 call centers. Each such call center will decide if and when to upgrade to NG9-1-1. Each such call center will upgrade, if at all, following its own deployment schedule consistent with its own needs and capabilities. As a result, there will be a significant period of time, possibly on the order of years, during which a caller in need of help may not know the capabilities of the particular call-center his emergency call will ultimately be routed to.

In general, a caller who knows this will revert to the lowest common denominator. He will simply place a call using the PSTN. However, not all callers will have the presence of mind to do so, particularly in an emergency. It is possible for a caller whose own local service has implemented NG9-1-1 to be on the road and to naively assume that all other call-centers support similar service. In such cases, the caller may send a text and assume that the emergency call center will receive it. Such a mistake could be the last the caller ever makes.

SUMMARY

In one aspect, the invention features a computer-implemented method for processing emergency calls. Such a method includes receiving an emergency call from a calling device via a first communication format, identifying a location associated with the calling device, identifying a destination for the emergency call based at least in part on the location, determining an attribute associated with the destination, and determining an action to be taken based at least in part on the first communication format and on the attribute.

In some practices, determining an attribute includes determining an ability of the destination to accept an emergency call in the first communication format.

In other practices, determining an attribute includes determining that the identified destination cannot accept emergency calls in the first communication format.

Additional practices of the invention include those in which determining an action includes determining a routing for the emergency call to the identified destination, those in which includes determining that the emergency call is to be routed to an alternative destination, the alternative destination being different from the identified destination, those in which determining an action includes determining that the first format of the emergency call is to be changed based on a capability of the identified destination, those in which determining an action includes determining that a responsive communication is to be sent to the calling device, those in which determining an action includes determining an action based at least in part on a result of a learning algorithm, and those in which determining the action includes determining that a query is to be issued to a rules database.

Other practices of the invention include those in which determining an action includes determining the action based at least in part on attributes associated with an emergency caller associated with the calling device. Among these are practices in which determining the action based at least in part on attributes associated with an emergency caller associated with the calling device includes determining the action based at least in part on a preferred communication format of the emergency caller, practices in which determining the action based at least in part on attributes associated with an emergency caller associated with the calling device includes determining the action based at least in part on a capability of the calling device, and practices in which determining the action based at least in part on attributes associated with an emergency caller associated with the calling device includes determining the action based at least in part on a subscription status of the emergency caller.

Some practices of the invention include identifying attributes associated with the emergency caller. Among these are those in which identifying attributes of the emergency caller includes accessing a caller registry.

Some practices of the invention include, in response to losing contact with the calling device, reconnecting with the calling device using a second communication format. Among these are practices in which the first communication format relies on a first sensory input of the caller and a second communication format relies on the first sensory input.

In another aspect, the invention features an apparatus for processing emergency calls. Such an apparatus includes a routing engine disposed to receive an emergency call in a first communication format from a calling device and to cause execution of an action based at least in part on an attribute associated with a destination of the call, the routing engine including a rules engine, and a rules database in communication with the rules engine, the rules engine being configured to select a rule from the rules database based at least in part on an attribute of the destination.

In some embodiments the routing engine is further configured to cause execution of an action based at least in part on an attribute of a caller originating the emergency call.

In yet another aspect, the invention features a manufacture including a tangible and non-transitory computer-readable medium having encoded thereon software for causing a particular data processing system to receive an emergency call from a calling device via a first communication format, to identify a location associated with the calling device, to identify a destination for the emergency call based at least in part on the location, and to determine an attribute associated with the destination, determining an action to be taken based at least in part on the first communication format and on the attribute.

In another aspect, the invention features a computer-implemented method for processing an emergency call. Such a method includes determining a location from which the call originates, determining that a communication format associated with the emergency call is a first communication format, based in part on the location, identifying candidate destinations for the emergency call, designating one of the candidate destinations as a designated destination based at least in part on an attribute of the destination and on the first communication format, and causing the emergency call to be forwarded to the destination.

Practices of the method include those in which wherein identifying candidate destinations includes identifying an NG9-1-1 compliant destination and a non-NG9-1-1 compliant destination.

Other practices of the invention include those in which designating one of the candidate destinations includes designating the NG9-1-1 compliant destination based on an ability thereof to communicate using the first communication format, those in which designating one of the candidate destinations includes designating the NG9-1-1 non-compliant destination, and wherein the method further includes trans-coding the emergency call into a second communication format that can be processed by the NG9-1-1 non-compliant destination, and those in which designating one of the candidate destinations includes designating a destination that is incapable of understanding the first communication format.

In another practice, the method further includes trans-coding the emergency call from the first communication format to a second communication format.

In another aspect, the invention features an apparatus for directing emergency calls to one of a plurality of destinations. Such an apparatus includes a routing engine disposed to receive an emergency call in a first communication format from a calling device and to designate one of a plurality of destinations as a designated destination for the emergency call. The routing engine includes a location module for determining a location from which the emergency call originates, a rules engine, and a rule database in communication with the rules engine. The rules engine is configured to designate a destination based at least in part on the first communication format and attributes of the candidate destinations.

In one embodiment, the routing engine is further configured to trans-code the emergency call from the first communication format into a second communication format, the second communication format being one that can be understood by the designated destination.

In another embodiment, the routing engine is further configured to select, as a designated destination for the emergency call, a destination that is incapable of understanding the first communication format.

The method described and claimed herein is tied to a particular machine. One such machine is a set of one or more physical computers that consume electricity, that generate waste heat in operation, and that have mass. The physical machine can be composed of geographically separated constituents. These machines are not abstract. They are tangible and made of physical matter. They also have all the attributes associated with matter.

Carrying out the method requires physical transformation of this particular machine into multiple different states, each characterized by different configurations of electric charge. Such transformations involve the movement and manipulation of electric charge. Since the machines themselves are made of matter, these transformations are transformations of matter.

In general, the machines are configured to implement the methods described herein. The implementation can be via software, for example using a programmable computer. However, the methods can be implemented by software, hardware, firmware, and any combination thereof.

Claims directed to computer readable media are expressly limited to tangible and non transitory computer readable and are not to be construed as claims to software per se. Claims directed to an apparatus are expressly limited to physical and tangible devices that have mass and that consume energy in operation. Software per se is expressly excluded from the scope of any claims. Practices of claimed methods and embodiments of claimed apparatus or computer readable media that happen to fall outside the scope of 35 USC 101 are expressly disclaimed herein.

It is also understood that components of the claimed apparatus or computer readable medium may be physically located in more than one jurisdiction. However, it is understood that the apparatus as a whole, and the computer readable medium as a whole, is operated for the benefit of and/or controlled by an entity, whether a juristic entity or otherwise, within one of the jurisdictions.

These and other features of the invention will be apparent from the following detailed description and the accompanying drawings, in which:

DETAILED DESCRIPTION

Throughout this description, the term "emergency call" will be used to refer to an emergency communication sent to an emergency communication service. An example of an emergency communication service is a 9-1-1 center. The emergency call could be in any one of a variety of communication formats, including but not limited to a conventional voice emergency call over the PSTN, a text message, such as that communicated via a short message service ("SMS"), a real-time text message ("RTT"), a video call, or a multi-media message sent via a multimedia messaging service ("MMS"). An "emergency caller" is the originator of the emergency call. For purposes of illustration, the following description will focus on RTT calls. However, the methods and systems described herein are applicable to all other emergency communication formats.

Figure 1:
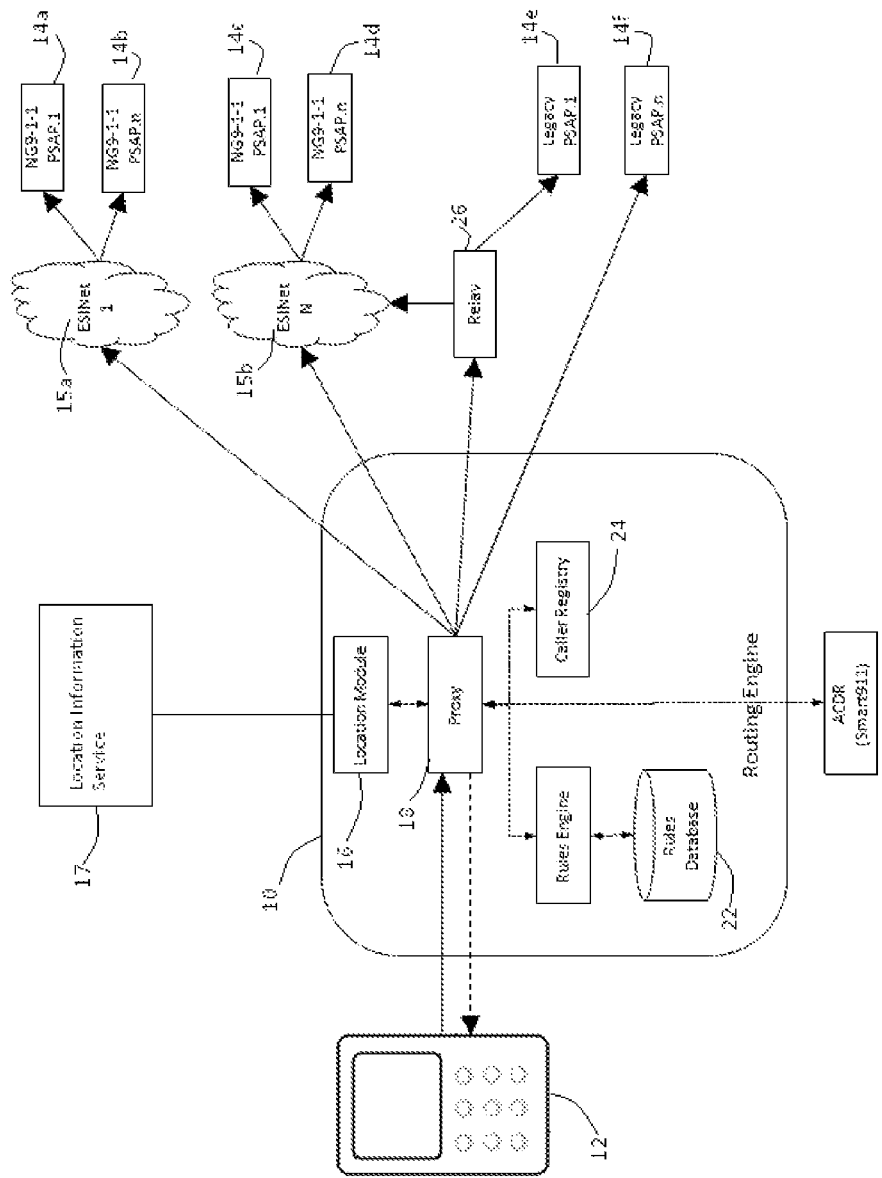
FIG. 1 shows a routing engine configured to route an incoming emergency call.

FIG. 1 shows a routing engine 10 for emergency communication between a calling device 12, used by an emergency caller, and public service access points 14a-f ("PSAP"). Some of these public service access points 14a-d are operated as part of an NG9-1-1 emergency services information network 15a-15b ("ESINet"). Other public service access points 14e-14f implement legacy systems. The illustrated routing engine 10 routes messages to emergency service networks 15a-15b or to individual public safety answering points 14e-14f, which may or may not be NG9-1-1 enabled. It does so based on a location and other caller information contained in or referenced by a session initiated protocol ("SIP") header or similar metadata accompanying the emergency call.

The routing engine 10 includes a location module 16 in communication with a location information service ("LIS") 17. The location information service 17 implements methods for improving upon an estimate of location provided by the calling device 12 or to obtain the location of the calling device 12 when no such location is specified within the metadata accompanying the emergency call. This location module 16 provides location information to a proxy 18 that processes the emergency call from the calling device 12.

The routing engine 10 further includes a rules engine 20 in communication with a rules database 22. The rules engine 20 accepts, as input, location information indicative of a region from which an emergency call originates and then determines the correct handling of that emergency call based on the rules defined for that region as well as other factors.

For example, an RTT call from a calling device 12 in a metropolitan area that supports RTT may be delivered immediately to public service access point 14f or the supporting 9-1-1 network in that area. However, another metropolitan area, even within the same state, may not support communication via RTT. In that case, the emergency call may be routed to a relay center 26 that is set up to handle RTT calls and to interpret them for a public service access point 14e. In some cases, an RTT call sent from a location whose 9-1-1 service does not support RTT may trigger an auto-response prompting the emergency caller to immediately place a traditional voice-only 9-1-1.

The National Emergency Number Association ("NENA") has specified procedures, set forth in NENA i3, for the handling of an emergency call within an emergency services information network through components such as an Emergency Services Routing Proxy and an Emergency Call Routing Function. However, there is no specification for how to manage and route calls in an environment in which different regions are in different stages of NG9-1-1 adoption. For example, NENA's Legacy Network Gateways provide no guidance on trans-coding calls from legacy communication technologies to anything other than one of the specified NG9-1-1 communication formats. Nor do they provide any way to automatically respond to emergency callers. In effect, an assumption exists that there will always be a compatible emergency communications center to which an emergency call can be routed. However, until NG9-1-1 is implemented nationwide, different regions will have different capabilities. Two regions may be right next to each other, and yet differ considerably in how they handle the same communication format. In fact, they may not even handle the same communication formats at all.

In addition to using information about the region to determine routing rules, the routing engine 10 is configured to use attributes of the calling device 12 to determine the best way to route the emergency call. For example, a public safety agency with authority over a certain region may determine that text messages from mobile phones will receive an automated message indicating that such emergency calls are in an unsupported communication format. But that same public safety agency may specify that messages from instant message ("IM") clients on a computer will be supported, but delivered only to a particular public safety answering point 14a.

In determining how to route an emergency call, the routing engine 10 can also take into account information concerning different downstream systems to which an emergency call should be routed. Such information can include the ability of those downstream systems to handle particular types of emergency calls. Based on information about the calling device 12, caller attributes, and downstream system capabilities and rules defined within the rules database 22, an incoming emergency call may be transformed from its input communication format into any one of a number of different protocols or formats, including, for example simple mail transfer protocol, short message peer-to-peer protocol, and session initiation protocol.

The routing engine 10 also incorporates a unique way for a public safety entity to re-initiate contact with the calling device 12. When a communication session with a calling device 12 terminates, there is often a need to re-connect with the calling device 12. In the simplest example, the calling device 12 may leave a cellular network coverage area, potentially interrupting the emergency communication for an extended period. This issue is of particular importance in mobile networks where a device is often moving and changing IP addresses.

The routing engine 10 further includes a caller registry 24 for identifying how to traverse the NG9-1-1 and interconnected service provider networks to direct an emergency call to a subscriber's calling device 12. This caller registry 24 is helpful in reinitiating communications over the same, or compatible protocol. However, the caller registry 24 also includes information to enable reconnection using one or more other communication formats supported by the calling device 12, or other communications devices at the emergency caller's disposal. This opens up the possibility of re-establishing communication with the calling device 12 using an alternative communication format in case of failure to establish communication using an initial communication format.

In one implementation, a caller registry 24 that identifies communication formats associated with a calling device 12 is described in U.S. Patent Publication No. 2011/0258266, published on Oct. 20, 2011, the contents of which are incorporated herein by reference.

The routing engine 10 in some embodiments includes software for recognizing differences between messaging protocols, and for performing protocol conversion necessary to allow communication between the calling device 12 and a public service access point 14a-14f using a communication format that makes use of the same human sensory organs, but uses incompatible technologies.

For example, the calling device 12 may have established a 9-1-1 emergency call to a public service access point 14b via SIP RTT. However, at some point in the emergency call, the communication between the calling device 12 and public safety access point 14b may have been lost. In this case, the emergency caller may be hard-of-hearing. In fact, this is probably why the emergency caller chose to make an RTT call in the first place. Thus, the emergency caller can only communicate via non-voice communication modes. Yet the only non-voice communication format that the public safety access point 14b supports may be the one that failed.

The routing engine 10 recognizes this discrepancy. When the public safety access point 14b attempts to re-initiate the SIP RTT call, the routing engine 10 trans-codes the RTT traffic into text messages (such as SMS via SMPP) and delivers these messages to the calling device 12. The routing engine 10 then translates responses from the calling device 12 back into RTT, which can then be understood by the public safety access point 14b.

In some embodiments, the rules in the rules database 22 include one or more learning algorithms or adaptive algorithms that may parse the content of an emergency call or learn and adapt over time. A number of different algorithms (e.g. neural network, linear regression, Bayesian and others) can analyze current and historical data sets to make predictions about future events. These algorithms can then be leveraged to create rules on how to respond when patterns in new data sets are recognized by the algorithm to be predictive of some event. For example, an algorithm can predict a denial of service attack against an emergency services network based on a pattern of new communication end points being established with the network. An algorithm may also parse the content of the emergency communication to infer the intent of the emergency caller. This intent may then become an input to the rules engine 20 to enable the rules engine 20 to determine the correct way to route and handle the emergency call.

One example of a learning algorithm makes inferences based on repetition, and uses those inferences to decide what actions to take. For example, the calling device 12 may send a text message that contains the text "Help, I have had an accident." The rules database 22 may include a text-scanning rule that identifies the word "accident" and, based on such identification, initiates a series of rules that routes the emergency call to the state police, alerts local providers of emergency medical services, and alerts ambulance services.

Another example of a learning algorithm uses repetition to seek clarification. For example, the learning algorithm may observe that a particular emergency call happens to be the fourth emergency call that mentions "accident" originating from the same area in a very short period of time. Based on this, the rules engine 20 may flag the emergency call as a potential duplicate. Declarative rules established by the entity managing the routing engine 10, or even automated rules determined by the learning algorithm, may then treat the emergency call differently from the first three emergency calls. For example, upon receiving this emergency call, the rules engine 20 may execute a rule causing the routing engine 10 to transmit an inquiry, such as "If this is related to the accident I-95 near exit 12, please be patient as units are already en route to assist you. If you are injured please respond with 'help' again." These rules can be automatically generated or implemented based on the probability of the event being a duplicate as determined by the learning algorithm.

In one example of operation, the emergency caller uses the calling device 12 to request assistance. This triggers an SIP INVITE. The SIP INVITE includes a header containing header information that includes geo-location information, device information, and caller information.

The proxy 18 queries the location module 16 to check for improved location data.

The proxy 18 also creates an entry in caller registry 24 with information about the calling device 12 and session information on the emergency caller. Creation of such an entry can occur at the time of the emergency call or, if the caller registry 24 is populated at the time the calling device 12 first comes on-line, prior to the emergency call. In some cases, the caller registry 24 can be co-located within the proxy 18.

The rules engine 20 then accesses the rules in the rules database 22 together with information stored in the caller registry 24 and determines the correct procedure for handling the emergency call. Correct handling may include routing the emergency call to the correct location, sending the emergency call to a relay center 26, transforming the emergency call into a communication format supported by a downstream system, or notifying the emergency caller that the communication format is not supported. For example, if the emergency caller is using RTT, and RTT happens not to be supported, the calling device 12 will receive a message such as "RTT unavailable, please call 9-1-1," or "Please wait while your message is re-routed." If appropriate, the proxy 18 then forwards the emergency call to an appropriate downstream system in an appropriate format and with correct data or de-reference URIs required by those systems.

Figure 2:
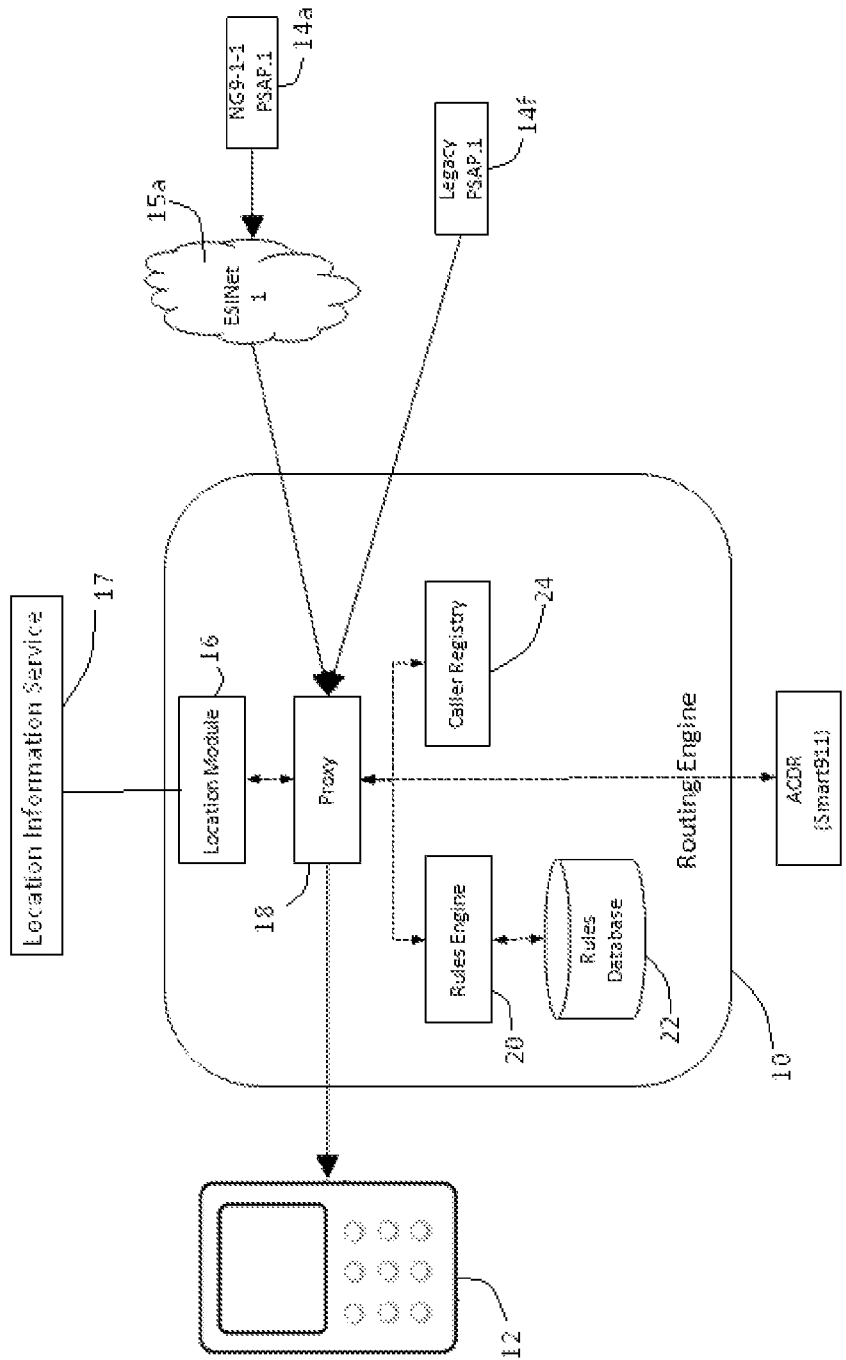
FIG. 2 shows the routing engine of FIG. 1 configured to reconnect a lost emergency call.

Referring now to FIG. 2, upon losing the emergency call with the calling device 12, the public safety access point 14a-14f provides the proxy 18 with a session ID that was initially associated with the emergency call and requests re-engagement with the calling device 12. In response, the proxy 18 queries the caller registry 24 to determine the best way to re-engage the calling device 12 and then calls back the calling device 12 using a communication format appropriate for the characteristics of the calling device 12.

As described herein, the routing engine 20 routes emergency calls between a calling device 12 and a public safety access point 14a-14f based on any combination of capabilities of the calling device 12, the location of the calling device 12, the type of protocol used, the capabilities of the public safety access point 14a-14f, the capabilities of the network itself, business rules, and attributes of the emergency caller.

As a result, it is possible to provide routing and call handling rules based on whether the public safety access point 14 associated with the location of the calling device 12 is or is not NG9-1-1 enabled.

Also implemented is an automated attendant that can respond to an emergency caller with specific instructions. For example, if the emergency caller attempts to use RTT to contact 9-1-1, an automated attendant can instruct the emergency caller that RTT is not supported and that a voice call should be placed instead.

Another benefit of emergency routing engine 10 is its ability to trans-code communications from one communication format to another enhances compatibility between different emergency networks. The routing engine 10 thus implements a form of shim between networks and frees the emergency caller from having to be aware of details such as the particular communication formats that can be used at a particular location.

The routing engine 10 further provides the ability to re-establish calls that have been interrupted, and to do so if necessary using alternate communication formats. Thus, an emergency call that begins as an RTT call can, after interruption, be seamlessly resumed as an SMS call.

In addition, the routing engine 10 adaptively learns from call content. Based on what it learns, the routing engine 10 processes calls differently depending on the context in which an emergency call occurs.

Having described the invention, and a preferred embodiment thereof, what is claimed as new and secured by Letters Patent is:

1. A computer-implemented method for processing emergency calls, said method comprising receiving an emergency call from a calling device via a first communication format, identifying a location associated with said calling device, identifying a destination for said emergency call based at least in part on said location, determining an attribute associated with said destination, and determining an action to be taken based at least in part on said first communication format and on said attribute.

2. The method of claim 1, wherein determining an attribute comprises determining an ability of said destination to accept an emergency call in said first communication format.

3. The method of claim 1, wherein determining an attribute comprises determining that said identified destination cannot accept emergency calls in said first communication format.

4. The method of claim 1, wherein determining an action comprises determining a routing for said emergency call to said identified destination.

5. The method of claim 1, wherein determining an action comprises determining that said emergency call is to be routed to an alternative destination, said alternative destination being different from said identified destination.

6. The method of claim 1, wherein determining an action comprises determining that said first format of said emergency call is to be changed based on a capability of said identified destination.

7. The method of claim 1, wherein determining an action comprises determining that a responsive communication is to be sent to said calling device.

8. The method of claim 1, wherein determining an action comprises determining an action based at least in part on a result of a learning algorithm.

9. The method of claim 8, wherein determining an action based at least in part on a result of a learning algorithm comprises parsing content of said call.

10. The method of claim 8, wherein determining an action based at least in part on a result of a learning algorithm comprises making an inference based on content of plural emergency calls.

11. The method of claim 1, wherein determining an action comprises determining said action based at least in part on at least one attribute associated with an emergency caller associated with said calling device.

12. The method of claim 11, wherein determining said action based at least in part on at least one attribute associated with an emergency caller associated with said calling device comprises determining said action based at least in part on a preferred communication format of said emergency caller.

13. The method of claim 11, wherein determining said action based at least in part on at least one attribute associated with an emergency caller associated with said calling device comprises determining said action based at least in part on a capability of said calling device.

14. The method of claim 11, wherein determining said action based at least in part on at least one attribute associated with an emergency caller associated with said calling device comprises determining said action based at least in part on a subscription status of said emergency caller.

15. The method of claim 11, further comprising identifying at least one attribute associated with said emergency caller.

16. The method of claim 15, wherein identifying at least one attribute of said emergency caller comprises accessing a caller registry.

17. The method of claim 1, wherein determining said action includes determining that a query is to be issued to a rules database.

18. The method of claim 1, further comprising, in response to losing contact with said calling device, reconnecting with said calling device using a second communication format.

19. The method of claim 18, where said first communication format relies on a first sensory input of said caller and a second communication format relies on said first sensory input.

20. The method of claim 1, wherein identifying a location occurs after having received said emergency call.

21. A manufacture comprising a tangible and non-transitory computer-readable medium having encoded thereon software for causing a particular data processing system to execute a method that comprises receiving an emergency call from a calling device via a first communication format, identifying a location associated with said calling device, identifying a destination for said emergency call based at least in part on said location, determining an attribute associated with said destination, and determining an action to be taken based at least in part on said first communication format and on said attribute.

22. A computer-implemented method for processing an emergency call, said method comprising determining a location from which said call originates, determining that a communication format associated with said emergency call is a first communication format, based in part on said location, identifying candidate destinations for said emergency call, designating one of said candidate destinations as a designated destination based at least in part on an attribute of said destination and on said first communication format, and causing said emergency call to be forwarded to said destination.

23. The method of claim 22, wherein identifying candidate destinations comprises identifying an NG9-1-1 compliant destination and a non-NG9-1-1compliant destination.

24. The method of claim 23, wherein designating one of said candidate destinations comprises designating said NG9-1-1 compliant destination based on an ability thereof to communicate using said first communication format.

25. The method of claim 23, wherein designating one of said candidate destinations comprises designating said NG9-1-1 non-compliant destination, and wherein said method further comprises trans-coding said emergency call into a second communication format that can be processed by said NG9-1-1 non-compliant destination.

26. The method of claim 23, wherein designating one of said candidate destinations comprises designating a destination that is incapable of understanding said first communication format.

27. The method of claim 23, further comprising trans-coding said emergency call from said first communication format to a second communication format.

28. A computer-implemented method for processing emergency calls, said method comprising receiving a first emergency call from a first calling device, receiving a second emergency call from a second calling device, receiving first information, receiving second information, based at least in part on said first information, routing said first emergency call to a first destination, based at least in part on said second information, routing said second emergency call to a second destination, wherein said first emergency call is a call that is in a first communication format, wherein said second emergency call is a call that is in a second communication format, wherein said first communication format is a format that is different from said second communication format, wherein said first information is indicative of a first location, wherein said first location is associated with said first calling device, wherein said second information is indicative of a second location, wherein said second information is indicative of a location of said second calling device, wherein said first destination has a first attribute, wherein said second destination has a second attribute, wherein said first destination has a third attribute, wherein said first attribute is the attribute of having an ability to receive an emergency call that is in said first communication format, wherein said second attribute is the attribute of having an ability to receive an emergency call that is in said second communication format, which is a format that is not the same as said first communication format, and wherein said third attribute is the attribute of lacking an ability to receive an emergency call in said second communication format, which is a format that is not the same as said first communication format.

* * * * *